(12) United States Patent
Ghosh (10) Patent No.: US 9,286,481 B2
(45) Date of Patent: Mar. 15, 2016

(54) SYSTEM AND METHOD FOR SECURE AND DISTRIBUTED PHYSICAL ACCESS CONTROL USING SMART CARDS

(75) Inventor: Subhas Kumar Ghosh, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 1474 days.

(21) Appl. No.: 11/624,471

(22) Filed: Jan. 18, 2007

(65) Prior Publication Data

US 2008/0173709 A1    Jul. 24, 2008

(51) Int. Cl.
*G06K 19/06* (2006.01)
*G06F 21/62* (2013.01)
*G06F 21/34* (2013.01)
*G07C 9/00* (2006.01)

(52) U.S. Cl.
CPC ............... *G06F 21/62* (2013.01); *G06F 21/34* (2013.01); *G07C 9/00103* (2013.01); *G07C 2009/0042* (2013.01)

(58) Field of Classification Search
USPC ............... 235/380, 379, 382, 439, 451, 492; 380/23, 230, 250, 28
See application file for complete search history.

(56) References Cited

U.S. PATENT DOCUMENTS

| | | | | |
|---|---|---|---|---|
| 4,304,990 A | * | 12/1981 | Atalla | 380/45 |
| 4,454,414 A | * | 6/1984 | Benton | 705/41 |
| 4,839,640 A | * | 6/1989 | Ozer | G07C 9/00103 235/382 |
| 5,420,927 A | | 5/1995 | Micali | |
| 5,604,804 A | | 2/1997 | Micali | |
| 5,610,982 A | | 3/1997 | Micali | |
| 5,615,269 A | * | 3/1997 | Micali | 705/80 |
| 5,666,416 A | | 9/1997 | Micali | |
| 5,717,757 A | | 2/1998 | Micali | |
| 5,717,758 A | | 2/1998 | Micall | |
| 5,717,759 A | | 2/1998 | Micali | |
| 5,793,868 A | | 8/1998 | Micali | |
| 5,960,083 A | | 9/1999 | Micali | |
| 6,097,811 A | | 8/2000 | Micali | |
| 6,292,893 B1 | | 9/2001 | Micali | |
| 6,301,659 B1 | | 10/2001 | Micali | |
| 6,487,658 B1 | | 11/2002 | Micali | |
| 6,766,450 B2 | | 7/2004 | Micali | |
| 7,065,210 B1 | * | 6/2006 | Tsujii et al. | 380/44 |

(Continued)

FOREIGN PATENT DOCUMENTS

EP    0 858 702 B1    4/2002

OTHER PUBLICATIONS

A. Menezes et al., "Hash Functions and Data Integrity", Chapter 9 from the Handbook of Applied Cryptography and including p. 347 which describes the algorithm MD5, CRC Press, 1996, pp. 320-383.

(Continued)

*Primary Examiner* — Michael G Lee
*Assistant Examiner* — Tabitha Chedekel
(74) *Attorney, Agent, or Firm* — Schiff Hardin LLP (57) ABSTRACT

A first code is read from a user carried device useable in an access control system. The first code is an encoded form of at least an ID of a user carrying the device and at least one privilege. The privilege defines the user's access to a resource. The first code is compared to a second code, and access is permitted only if the first code compares favorably to the second code. A reader of the access control system computes the second code based on the user ID and the privilege. The first and second codes may be also based on a secret key applicable only to the user.

32 Claims, 6 Drawing Sheets

(56) References Cited

U.S. PATENT DOCUMENTS

| | | | | |
|---|---|---|---|---|
| 7,334,255 | B2* | 2/2008 | Lin | H04L 63/0428 713/168 |
| 7,337,325 | B2* | 2/2008 | Ikegami et al. | 713/182 |
| 7,475,812 | B1* | 1/2009 | Novozhenets et al. | 235/382 |
| 2003/0028814 | A1* | 2/2003 | Carta | G07C 9/00039 726/21 |
| 2007/0118891 | A1* | 5/2007 | Buer | 726/8 |
| 2007/0215693 | A1* | 9/2007 | M'Raihi | 235/380 |

OTHER PUBLICATIONS

P. Bonatti et al., "A Modular Approach to Composing Access Control Policies", In Proc. 7th ACM Conference on Communications and Security, Aug. 2000, pp. 164-173.

L. Giuri et al., "A Formal Model for Role-Based Access Control with Constraints", In Proc. of the Computer Security Foundations Workshop, 1996, pp. 136-145.

S. Jajodia et al., "Flexible Support for Multiple Access Control Policies", ACM Transactions on Database Systems, vol. 26, No. 2, Jun. 2001, pp. 214-260.

S. Micali, "Efficient Certificate Revocation", Technical Memo, Massachusetts Institute of Technology/ Laboratory for Computer Science/TM-542b, 1996, pp. 1-10.

S. Osborn et al., "Configuring Role-Based Access Control to Enforce Mandatory and Discretionary Access Control Policies", ACM Trans. on Information and System Security, vol. 3, No. 2, May 2000, pp. 85-106.

A Smart Card Alliance White Paper, "Contactless Technology for Secure Physical Access: Technology and Standards Choices", Oct. 2002, pp. 1-36.

A Smart Card Alliance White Paper, "Using Smart Cards for Secure Physical Access", Jul. 2003, pp. 1-54.

S. Barker et al., "Flexible Access Control Policy Specification with Constraint Logic Programming", ACM Trans. on Information and System Security, vol. 6, No. 4, Nov. 2003, pp. 501-546.

R. Sandhu et al., "Role-Based Access Control Models", IEEE Computer, vol. 29, No. 2, 1996, pp. 38-47.

* cited by examiner

SYSTEM AND METHOD FOR SECURE AND DISTRIBUTED PHYSICAL ACCESS CONTROL USING SMART CARDS

TECHNICAL FIELD

The present application describes the use of user carried access control intelligent devices such as smart cards in secure and distributed access control systems.

BACKGROUND

Access control is frequently implemented to control the access of users to resources and/or to make decisions about denying or granting access to those resources. In the context of physical access control, these resources are typically rooms or, more generally, restricted areas guarded by entrances or doors. However, instead of physical spaces, the spaces could be logical spaces guarded by logical entry points.

The description below refers to the use of intelligent cards, such as smart cards, in connection with the control of access to resources. However, it should be understood that the present invention is applicable to any user carried device that can interface with other devices, such as readers and a central authority, so as to allow the user carrying the user carried device to gain access to a resource.

Intelligent cards are increasingly becoming popular for storing user credentials and enforcing access control. The implementation of access control has traditionally relied on the use of an identity card and a card reader. The identity card verifies the identity of the card holder, and the card reader reads information stored on the identity card and determines whether the card holder has a requested privilege, such as access to a controlled area. A PIN (personal identification number) can additionally be provided via a keypad to further add an additional level of authentication security. Biometrics can also be used to increase authentication security.

Intelligent cards, however, provide an enhancement over traditional cards for a variety of reasons. They support a framework to write/update user specific information in a secure manner. Security enhancement features such as biometrics can be implemented on the intelligent cards to build an extremely secure environment for the authorization of users and the validation of user privileges. Intelligent cards address a growing need to store, in a single device, more access rights and privileges to a wide variety of diverse resources. Multiple applications can use the information stored on intelligent cards to authenticate the user for access to a variety of physical and logical resources. And, intelligent cards can be used for many purposes such as paying fees, certifying transactions, or tracking the user's activities for audit purposes.

At a physical level, intelligent cards can include technologies such as magnetic/wiegand stripes or RF chips to read/write information, and possibly chips to perform a limited amount of computation. User credentials that can be securely written to these intelligent cards could include the user ID, a PIN, biometric information, or a combination of these identifying data.

One of the important features of intelligent cards is the capability of using cryptographic techniques to protect information. Intelligent cards support symmetric cryptographic algorithms, which insure substantial protection as well as efficient processing time. Intelligent cards increasingly support public key infrastructure (PKI) privileges using asymmetric cryptographic algorithms for storing certificates, which provide a mechanism for data integrity and validity.

Moreover, with a growing demand for scalability of access control to multiple users and resources, there has been a parallel trend towards decentralization. In traditional access control, resources work in a pull based mechanism where readers communicate to a central server to process user credentials online, and where the central server communicates back to the readers based on the security policies applicable at that time.

Changes to the security policies and the user privileges are maintained at the central server such that they are available immediately in the entire system. For example, when an employee leaves the organization, all privileges applicable to that employee can be immediately revoked.

While this approach seems very suitable for enforcing access policies online, it may not scale well to large facilities requiring vast numbers of intelligent cards and readers. As the number and categories of resources and users increase, the amount of load on a central server increases, communication costs rise, and there is a natural increase in latency for responding to access requests.

By contrast, a decentralized solution would enable the local resources to make decisions without connecting to a server online and is emerging as an attractive solution for several applications such as building control.

One approach for decentralization that is used in practice is a push based scheme, wherein resources work in an offline mode, and the latest information and access control policies are pushed down to the local resources periodically from a central server. During an access request by a user, a local resource does not connect to the central server, and makes its own decision based on the latest information that it stores. This method avoids online communication to the server, and thereby reduces the latency for granting access control.

However, the information stored by the local resources may not be the latest available information. Furthermore, a communication link between each local resource and the central server is still required, which means that this solution is not a totally decentralized solution. For example, in the area of access control for buildings, the push based scheme cannot be applied when it is necessary to install disconnected readers in remote areas that may not all be wired to the central server.

An alternative approach is the use of the intelligent cards to store user credentials as well as the user's associated privileges for multiple applications. In such a setting, it is important to address the issue of how to securely store these user credentials and privileges on intelligent cards, how these user credentials and privileges are to expire in a time bound manner, and how they can be revoked in real-time by the proper authority. Furthermore, different resource categories and corresponding privileges must be accommodated in a single framework. For example, a local resource such as a file could provide no access, read only access, write only access, or a combination of read and write access while a door in a physical campus could provide a binary access.

An important approach for secure user authentication is the use of the public key infrastructure (PKI) framework based on asymmetric key cryptography. In this framework, the user is issued a certificate that is signed by a central authority. This issuance uses a secret private key known only to the central authority. The information in the certificate, however, can be validated by third parties using a public key which is published by the central authority. The basic idea is that the certificate cannot be generated without knowing the private key; but can be validated by anyone using the public key. This arrangement guarantees data integrity and protects the information in the certificate against tampering.

In the context of intelligent cards, a certificate can be generated for each user by the central authority and be stored on the intelligent cards. The certificate can carry authentication credentials such as a user ID and could involve additional credentials such as biometric information. The certificate can also contain privileges defining a user's access to local resources. The reader at the local resource level could validate the certificate using the public key of the central authority for authentication and verify the user's privileges to the requested resource.

Figure 1:
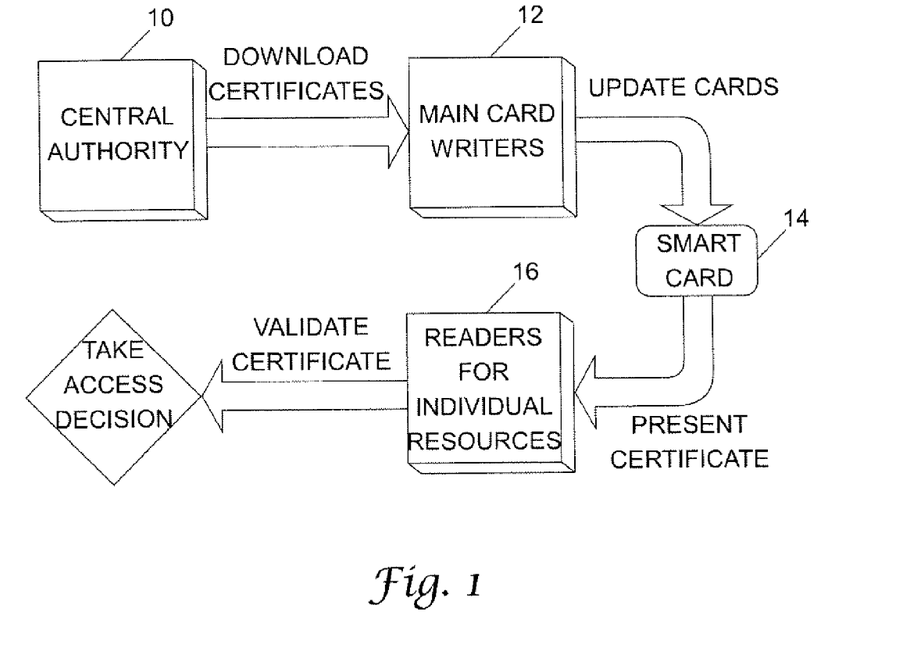
FIG. 1 illustrates an arrangement in which a central authority issues certificates that are stored on intelligent cards.

In the context of intelligent cards, a rough schematic of this scheme is shown in FIG. 1. A central authority 10 downloads the certificates to one or more terminals 12 that write information including the certificates on the intelligent cards 14. The user presents the intelligent card containing the certificate to individual readers 16 in order to obtain permission to access the corresponding local resource.

Typically, certificates are time bounded. For example, the certificates could potentially be valid for a year. Updating certificates after their expiration does not pose a problem. However, there is the issue of revoking a certificate if some security reason arises before its normal expiration. A traditional revocation method uses certification revocation lists that list those certificates that are revoked and are no longer valid. These certification revocation lists can either be maintained by the central server it the local readers operate in a pull based approach; or, the certification revocation lists could be periodically pushed to the individual readers in a push based approach. However, the certification revocation lists may get huge as the number of revoked certificates increases, and may not scale well in large applications involving a large number of users.

Lately, there have been suggested some optimized solutions where certificate revocation is performed using one way hash functions. In this scenario, the amount of information needed to revoke a certificate is as low as 20 bytes per certificate. This hash based approach provides an efficient technique in situations where the number of certificates involved is on the order of millions. This technique also provides an elegant solution to address revocation of certificates even when the local readers are completely disconnected. In such scenarios, intelligent cards are required to update the information (20 byte information) at the end of each time interval (possibly everyday) for renewing the validity of the certificate.

Using the above described PKI approaches, it seems possible to have the certificates stored on intelligent cards generated once and updated periodically, so that the problem of revocation can be addressed (at least on a one day granularity) even in a completely decentralized setting. This method seems appropriate where the certificate information is not likely to change often, such as membership to a role in a particular organization.

However, this approach also does not scale well in the context of granting finely (as opposed to coarsely) defined privileges with respect to a diverse set of resources. While it is possible to have these finely defined privileges inside the certificate, changes in the resources and associated privileges would involve regeneration of the whole certificate.

Another option would be to have multiple certificates for each resource grant; but relying on multiple certificates could pose a serious space problem for intelligent cards. In order to tackle this problem, a symmetric based scheme to store user privileges specific to different resource classes on the intelligent card is proposed herein. This symmetric based scheme is explained in detail below in the detailed description section.

Another problem with the PKI approach is that it does not provide a mechanism for individual resources to write information on intelligent cards in a secure manner. For example, in a physical access control scenario, it may be useful for resources to write specific information on an intelligent card in a secure manner so that the information could be used by other resources in order to enforce certain policies. Using the PKI approach, this information writing would involve having a private/public key at each resource level, which would give rise to key management issues, especially if the number of resources grows large. The symmetric key approach explained in detail below in the detailed description section provides an efficient manner to share data between different classes of resources, and thereby enable state dependent access control policies.

SUMMARY

In accordance with one aspect of the present invention, a method of controlling access to a resource comprises the following: reading a first code from a user carried device, wherein the first code comprises an encoded form of at least an ID of a user and at least one privilege, and wherein the privilege embodies a policy defining the user's access to the resource; comparing the first code to a second code; and, permitting access only if the first code compares favorably to the second code.

In accordance with another aspect of the present invention, a method of controlling access to a resource comprises the following: storing a first code on a user carried device, wherein the first code is based on at least an ID of a user, at least one privilege, a first secret key, and an encoding function, and wherein the privilege defines the user's access to the resource; computing a second code from the user ID, the privilege, a second secret key, and the encoding function, wherein the first and second secret keys are symmetrical, and wherein the second secret key is stored in a user carried device reader; comparing the first code to a second code; and, permitting access only if the first code compares favorably to the second code.

In accordance with still another aspect of the present invention, a reader of an access control system that controls access to a resource comprises a memory and a processor. The memory stores a secret key. The processor reads the secret key from the memory, and reads an ID of a user, at least one privilege, and a first code from an user carried device carried by the user. The processor computes a second code based on the secret key read from the memory and the user ID and privilege read from the user carried device, and compares the first code to the second code. The processor permits access to the resource based on the comparison. The privilege defines the user's access to the resource, and the first code comprises an encoded form of at least the user ID and the privilege.

In accordance with yet another aspect of the present invention, a user carried device for use by an access control system that controls access to a resource comprises a memory and an interface. The memory stores an ID of a user, at least one privilege, and a hash value. The hash value is based on an application of a hash function to encrypted data, the encrypted data is based on the user ID, the privilege, and a key, and the privilege embodies a policy governing the user's access to the resource. The interface communicates the user ID, the privilege, and the hash value to a reader of the access control system.

BRIEF DESCRIPTION OF THE DRAWINGS

These and other features and advantages will become more apparent from the blow detailed description when taken in conjunction with the drawings in which.

DETAILED DESCRIPTION

A security framework for storing privileges to diverse resources on intelligent cards such as smart cards may be based on symmetric keys. The privileges are securely stored so that attackers cannot forge or tamper with the information that is written on the intelligent cards by the central authority, a reader, or other device. Furthermore, the framework described below addresses changes in privileges with time, and also addresses the issue of revocation of privileges. The approach described below has several benefits in terms of speed and memory requirements as compared to PKI approaches. Moreover, resources can exchange information amongst each other in a secure manner without knowing mutual key information. The approach described below is, therefore, suitable for enforcement of state dependent access policies in a decentralized setting.

I. Problem Statement, Definitions and Threat Model

The terms "access space," "authority," "resource/resource class," and "user" are first defined.

DEFINITION—Access space: A secure access space contains an authority, one or more resources or resource classes, and one or more users. Thus, an access space can be viewed as a directed graph. If the set of resources in an access space is denoted as $P=\{r_1, r_2, \ldots, r_m\}$ and users as $Y=\{u_1, u_2, \ldots, u_n\}$, then each user will have certain access privileges with respect to each of the resources. If such access privileges are denoted as $\Pi=\{p_1, p_2, \ldots, p_k\}$, then a resource $r_i \in P$, providing privileges $P_i \subset \Pi$ can be denoted by directed arrows from $r_i$ to $\forall p_k \in P_i$. Similarly, if $u_j \in Y$ has access privileges $P_{j,k} \subset \Pi$ with respect to resource k, then directed arrows can be drawn from $u_j$ to $\forall p_i \in P_{j,k}$.

DEFINITION—Authority: Authority plays the central role of owning the resources. Thus, the authority decides which grants can be given to what users with respect to specific resources. The authority has the installation responsibilities of the resources. During installation, the authority also provides the keying material to the resources, and updates the time state in a user's grant matrix at the end of each time epoch through a push mechanism.

DEFINITION—Resource/Resource Class: The resources provide access to a user after validating the set of privileges presented by the user to a resource. This process is completely off line, i.e., without involving the central authority. The resource also holds the responsibility to maintain the global time state and to update itself at each time epoch.

DEFINITION—User: The intelligent card carried by the user stores the user's (possibly unique) set of privileges and presents the set of privileges to a resource in order to gain access. The privileges are generated and given to the user by the authority. The user needs to update the set of privileges at the end of each time epoch; otherwise, further access requests will not be honored.

The following notations are used in describing the rest of the protocol: $E_K(d)$ is an encryption of data d, under secret key $K_j$ between a node j and the central authority; $t_0$ is the starting time of an installed resource; $P(r_j)$ denotes the set of privileges corresponding to the $j^{th}$ resource or resource class; H: $[1,0]^n \rightarrow [1,0]^m$ is an encoding function such as a hash function wherein the hash function may be a one way hash function; Y/N is an r-bit globally known value where the r-bit value for Y is different from the r-bit value for N and indicates whether an access privilege is valid; $IV_j$ is an n bit initial value or initialization vector that is used by a block cipher $CIPH_K$ for resource or resource class j; and, $U_i$ is an r-bit user ID that is unique for each user i.

Intelligent cards may be arranged to support read and write operations for storing and retrieving credentials and privileges. The following are possible threats that could be possible in this scenario: (1) a user could change the privileges in his card and achieve access to resources to which the user is not entitled; (2) a user whose privileges have been revoked may try to reuse the user's intelligent card in order to get privileges; (3) a first user could read a second user's intelligent card and copy the corresponding privileges of the second user onto the intelligent card of the first user; and, (4) a first user could use a second user's intelligent card to gain access to resources.

The arrangement described herein addresses the first three threats. The fourth threat may be handled by a strong authentication mechanism (such as biometrics) for secure authentication.

The first threat is addressed by generating a code from the privileges based on a secret key and storing a hash value of this code on the intelligent card for validation.

The second threat is addressed by changing these codes periodically so that privileges issued during an earlier time interval are not valid during future time intervals. However, privileges that are valid during the current time interval are not revoked instantaneously, and are revoked only at the end of the current time interval. So, it is possible to misuse a revoked privilege during the corresponding time interval.

The third threat is addressed by basing the hash value on both the user credentials (such as user ID) and the corresponding privileges. So, a user's privilege cannot be copied onto a different user's intelligent card.

A security framework, which determines the grant of access permissions, is stored on the intelligent card. This security framework prevents the user from tampering with the information on the intelligent card in order to gain illegal access, and also ensures that privileges expire after a fixed time interval. It is possible to provide granular resource level privileges to different users, which can change over time.

II. Security Framework using Symmetric Keys

Symmetric keys may be used for storing access privileges of users to resources. For example, authentication may be handled by PKI (using user ID, a PIN, biometrics, and/or a combination of these or other security measures), such that each resource can use the public key of the central authority to validate the data integrity of user credentials. The validation of access privileges to resources may be done using a symmetric secret key.

The secret key is symmetric because the central authority stores one piece of unique information for jth user's access on ith resource. This unique information can change from time to time. The central authority and the resource can compute the secret key locally based on this information without any communication. As long as the central authority and the resource are in the same time epoch and the secret key is for the same user, they will compute the same secret key.

Access privileges to resources are stored on the intelligent card directly (possibly as plain text) without any encryption. To ensure data integrity, an additional piece of information is written on the intelligent card for each resource class by the central authority, which is validated by the individual resources (at the reader level). This additional information ensures that the access privileges written by the central authority is not tampered with or forged by an unauthorized user. Because each resource or resource class has a different secret key, resources cannot change information pertaining to other resources in their own class or different class. Furthermore, this additional information allows automatic expiration of the privileges, and thereby addresses the problem of revocation.

For each user j and each resource class $r_k \in P$ to which the user has access, a hash value $S_j(r_k)$ is generated and is stored on the intelligent card along with the access privileges $P_j(r_k)$ that are applicable to the corresponding resource and user. This hash value is such that no one apart from the resource belonging to that class and the central authority can generate it. That is, the central authority generates this hash value and stores it on the intelligent card, and the resource generates this hash value at the time of an access request and uses it to validate the access privilege stored on the intelligent card without connecting to the central authority online.

Furthermore, this hash value expires after a fixed time interval (possibly one day), and so is automatically revoked. In order to renew the privileges, the intelligent card needs to be updated with a new hash value applicable during the active time interval. Hence, intelligent cards require updating by their users at the beginning of each time interval so that the user's privileges are renewed. The duration of the time interval could vary depending on need.

The Appendix at the end of this detailed description provides the pseudocode for the algorithm that generates the hash value. The method represented by this pseudocode begins by inputting a secret key that is shared between the resource class and the central authority. It is assumed that this secret key has been transferred to the resource class in a secure manner (possibly during installation). In addition, a secret initial seed (initialization vector or initial value) is also passed to each resource class.

The goal is to generate a hash value that can be generated from the resource privileges and the secret key, and which also changes during each time interval in a systematic manner without the need of communication between the central authority and the resource.

Figure 2:
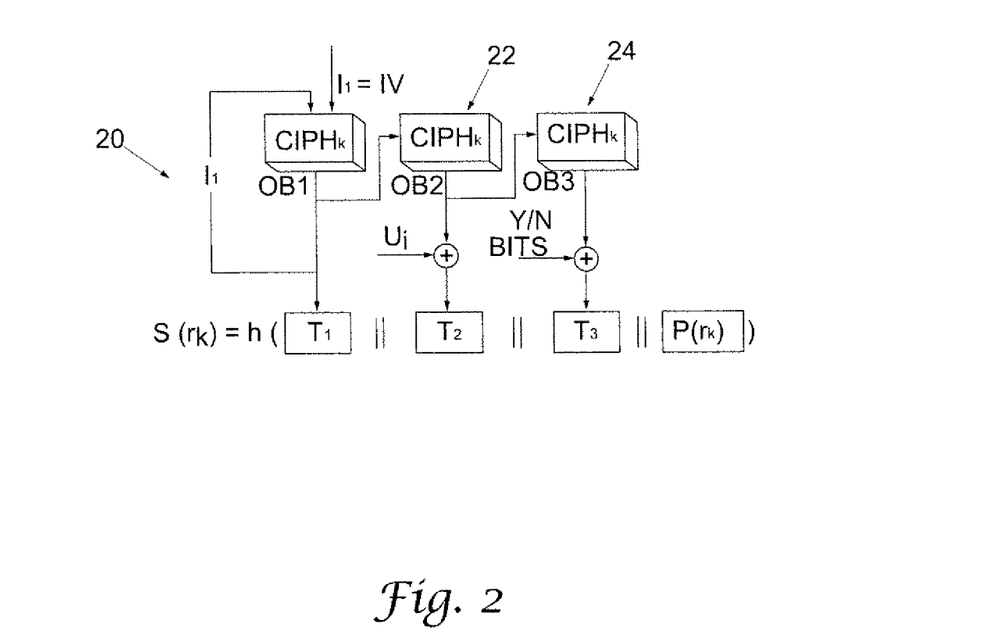
FIG. 2 illustrates a method for validating resource privileges stored on an intelligent card.

For achieving this purpose, a three block cipher operation as shown in FIG. 2 is used. According to the algorithm in the Appendix and as shown in FIG. 2, the initial seed $IV_j$ during a first time interval is passed into a first block cipher 20. The first block cipher 20 applies the secret key $K_j$ for resource j to the initial seed $IV_j$ so as to generate an output $OB_1$. This output $OB_1$ is the value $T_1$. A second block cipher 22 applies the secret key $K_j$ for resource j to the output $OB_1$ so as to generate an output $OB_2$. The output $OB_2$ and the user credentials $U_i$ for user i are added so as generate a value $T_2$. A third block cipher 24 applies the secret key $K_j$ for resource j to the output $OB_2$ so as to generate an output $OB_3$. The output $OB_3$ and an integer input that denotes a yes/no (these integers are predetermined and can be known publicly) are added so as generate a value $T_3$. The values of $T_1$ $T_2$, and $T_3$ are concatenated along with the privileges $P(r_k)$ that are applicable to the access of user i to resource j, and the concatenation is passed to a hash function (such as MD5 described by A. Menezes and S. Vanstone in Handbook of Applied Cryptography, CRC Press, 1996) in order to generate the hash value $S(r_k)$.

The hash value $S(r_k)$ is self-expiring. That is, during each time epoch, the value of $T_1$ is computed by the central authority and the resource. This computation creates a symmetric secret between the central authority and the resource. When a particular user comes to the central authority, T2 is computed, which makes T2 user specific, and T3 is computed to show that the user is still a valid user. Finally, T1 T2 and T3 are combined and hence this hash value is valid only for a valid (T3) particular user (T2) on a resource (T1) for the set of privileges within the current time epoch (T1). This procedure ensures that the hash generated for a previous time interval is no longer valid after the expiry of that interval.

The algorithm used in the $CIPH_K$ blocks of FIG. 2 could be any standard "block cipher" algorithm such as DES, AES, Triple DES, or Skipjack as recommended by NIST-CSRC.

The central authority executes this algorithm in order to generate the hash value $S(r_k)$ and store it on the intelligent card of user i. The reader repeats this same algorithm using the resource privileges $P(r_k)$ and the user credentials $U_i$ available from the intelligent card, and using the yes/no values as well. The reader compares the hash value stored on the intelligent card to the hash value that it computes in order to determine if the resource privileges are applicable to the user or have been revoked by the central authority or have been tampered by the user.

An important part of the architecture is to feed back the $T_1$ value into the first cipher block 20 for the next time interval. This feedback ensures that, for each time interval, new secret values are generated for $T_1$, $T_2$, $T_3$ and the hash value. The hash generated for a previous time interval is no longer valid after the expiration of that interval. Furthermore, knowledge of the previous hash values does not help in generating the hash values for future time intervals because the generation of hash values involves secret keys and the current value of $T_1$.

The first $CIPH_k$ block in FIG. 2 uses its output as feedback which is stored in the reader and is fed back so that the reader understands that a new time epoch has started.

It may be noted that there is no requirement to encrypt the privileges stored on the intelligent cards. Any tampering with these privileges would be detected at a resource due to the change in the generated hash value. However, it could be useful to transfer some information to the individual resources in an encrypted form. One situation where such a need might arise is during the enforcement of dynamic or state dependent policies, where resources write back information to the intelligent card where such information can be used by other resources for making control decisions. For example, a person may be allowed to access a computer resource only if that person has been granted access to the main building reader. This rule would require the main reader to write the specific information to the intelligent card securely so that this rule can be used by the computer resource for making access decisions.

One method to address this issue is to use a common key $K_c$ between all resources (in addition to the individual resource secret keys $K_j$) to encrypt and decrypt the information written to the intelligent card. However, the problem with this approach is that, if one resource is compromised, the security of the entire system is compromised. This compromise would require reconfiguring of the entire system, which may not be easily possible, since the system consists of disconnected readers.

Figure 3:
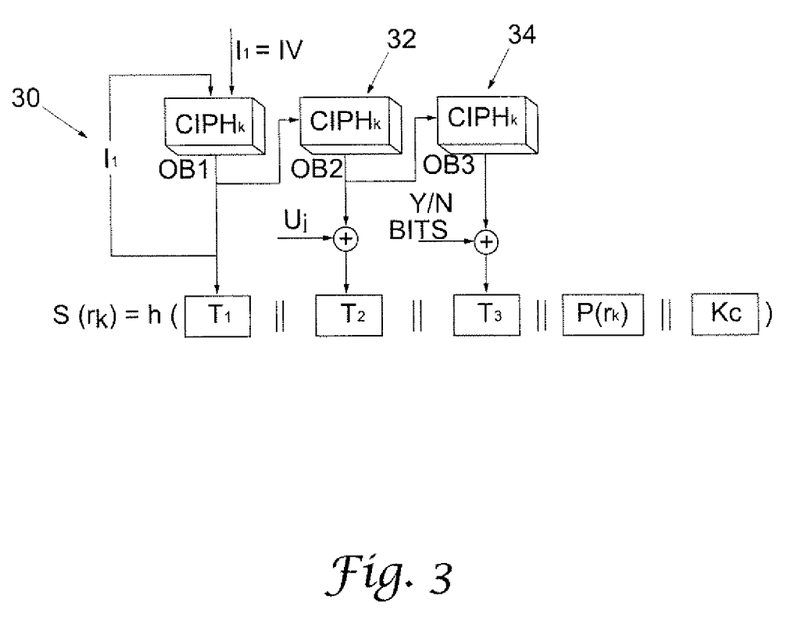
FIG. 3 illustrates validation of resource privileges along with encrypted information.

In such a scenario, it would be useful for the central authority to have control of the common key, and to be able to transmit this key to individual resources via intelligent cards. The common key approach can be achieved by extending the proposed scheme to additionally store, for each resource, the encrypted common key along with the corresponding privileges, and by using this encrypted common key in the generation of the hash value. An extended validation routine that supports this encrypted information is shown in FIG. 3.

The only change in the algorithm as compared to that set out in the Appendix and shown in FIG. 2 is in the generation of the hash which is done along with the encrypted common key. If $K_c$ represents the common key and $E_j(K_c)$ represents the encrypted value using the common key of resource j, then the hash value that is generated is given by the following:

$$S(r_j) \leftarrow H(T_1|T_2|T_3|P(r_j)|K_c).$$

At each resource level, the common key is first determined by decrypting the encrypted information $E_j(K_c)$. This information is validated by generating the hash value shown above, and verifying whether it matches with the hash value stored in the smart card. In this mechanism, the central authority can change the common key as and when required (possibly after each time interval), and convey the same securely to the required resources. It is also possible to have different common keys for different users in this approach.

III. Enforcing Access Policies

There have been several prior approaches that provide a framework for defining access policies. Prominent among these are Discretionary Access Control (DAC), Mandatory Access Control (MAC), and Role based access control (RBAC) described by R. Sandhu, E. Coyne, H. Feinstein, and C. Youman in "Role based access control models," IEEE Computer, 29(2):38-47, 1996, by L. Giuri and P. Iglio in "A formal model for role based access control with constraints," Proc. of the Computer Security Foundations Workshop, pages 136-145, 1996, and by S. Osborn, R. Sandhu, and Q. Munawer in "Configuring role based access control to enforce mandatory and discretionary access control policies," ACM Trans. on Information and System Security, 3(2):85-106, May 2000. There have also been several frameworks for enforcing these access policies, mainly using logic programming languages as described by P. Bonatti, S. D. C. di Vimercati, and P. Samarati in "A modular approach to composing access control policies," Proc. 7th ACM Conf. on Communications and Security, pages 164-173, August 2000, by S. Jajodia, P. Samarati, M. L. Sapino, and V. S. Subrahmanian in "Flexible support for multiple access control policies," ACM Transactions on Database Systems, 26(2), June 2001, and by B. S. and P. J. Stuckey in "Flexible access control policy specification with constraint logic programming," ACM Transactions on Information and System Security, 6(4), November 2003. While these policy enforcement models are suitable for centralized systems, the security aspect of policy enforcement has not been dealt with extensively in a decentralized setting. The framework described herein is general enough to be used to enforce access policies formulated according to different models of a decentralized system.

An access policy framework consists typically of a static portion, which determines how roles impact relations to resources, and a dynamic or state dependent portion, which determines how the current state of the system (including the events that have happened in the past) impact access privileges to resources.

The static portion of the policy model can be implemented (using separate software) as a table that determines which resources can be accessed by which users according to which associated privileges. This table can be stored on the intelligent cards using the symmetric keys of the respective resources. The state dependent policies can be enforced by encrypting the common key that can be used by the resources to read/write state-dependent information of the user on the intelligent card of the user.

In the framework described herein, it is possible to provide access privileges in multiple levels to different resources. This method just needs an addition of information such as 20 bytes (a typical size for the hash value) for each resource class. A calculation shows that an intelligent card having around 64 Kb of memory could potentially store 3000 resource-classes, each class having 256 possible grants. In a PKI framework, user privileges can be given by issuing one certificate for all resources or different certificates for each resource. Both these approaches are expensive. The former may involve issuing new certificates very frequently (with every change of privilege for any resource), while the latter is expensive in terms of storage since multiple certificates for each resource class would need to be stored on the intelligent card.

Furthermore, because the approach described herein can be based on symmetric keys, it would be several times (around 100 times) faster than conventional PKI based approaches. This advantage could be critical in some applications, such as physical access control where readers may not have a large processing capability, and access privilege needs to be validated in real time.

Another interesting feature of the approach described herein is the usage of a cipher block to ensure temporal validity. This usage is more robust than providing time validity as part of the resource privilege matrix since the latter approach can be compromised by backdating the time in the readers, which cannot be done in the approach described herein. However, it is important that the reader and the central authority have a common notion of time, and denial of service could take place by changing the clock of the reader.

Figure 4:
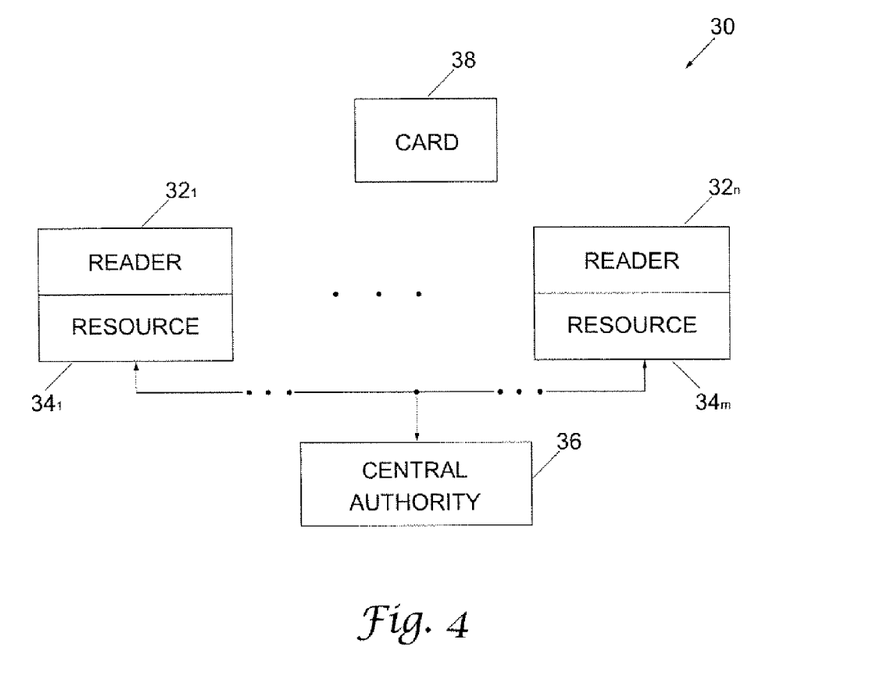
FIG. 4 shows a physical resource access control system as an example of an environment in which the present invention may be practiced.

FIG. 4 shows a resource access control system 30 as an example of an environment in which the present invention may be practiced. The resource access control system 30 includes a plurality of readers $32_1, \ldots, 32_n$ that control access to a plurality of resources $34_1, \ldots, 34_m$. The resources $34_1, \ldots, 34_m$, for example, may be computers, or areas of a building with each area comprising one or more rooms, etc. A resource could be controlled by more than one reader, or a reader could control more than one resource.

Information such as secret keys $K_j$ may be communicated by a central authority 36 to the resources or resource classes $34_1, \ldots, 34_m$ either by a wired link or by a wireless link. Each user who is permitted access to one or more of the resources $34_1, \ldots, 34_m$ is issued an intelligent card 38, such as a smart card. A user presents the intelligent card 38 to an appropriate one of the readers $32_1, \ldots, 32_n$ when the user wishes access to one of the resources $34_1, \ldots, 34_m$. That reader grants or denies access in accordance with processing as described above and further described in connection with FIG. 7.

Figure 5:
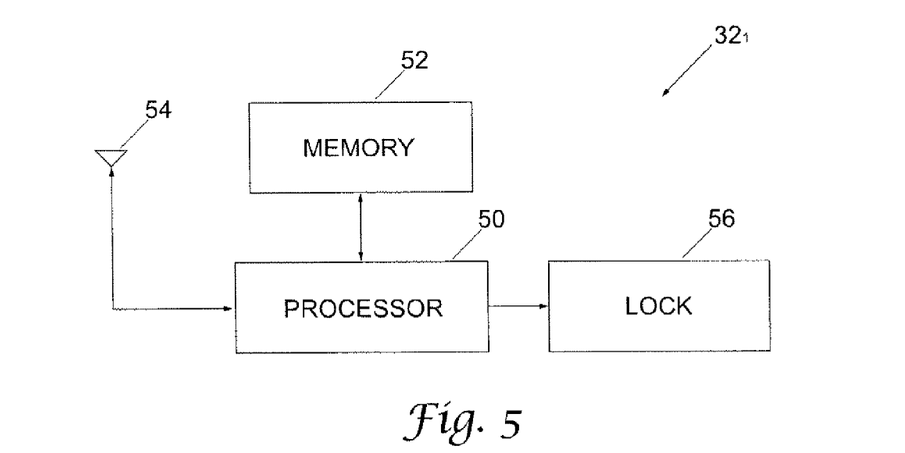
FIG. 5 illustrates a reader of the physical resource access control system shown in FIG. 1.

FIG. 5 illustrates a representative one of the readers $32_1, \ldots, 32_n$ such as the reader $32_1$. The reader $32_1$ includes a processor 50, a memory 52, and an interface 54.

The interface 54 represents any mechanism by which information is exchanged with the intelligent card 38. For example, the interface 54 may be an antenna and a transceiver for exchanging information with the intelligent card 38 over an RF link. Alternatively, the interface 54 may represent a magnetic, optical, ultrasonic, pluggable, or other link between the intelligent card 38 and the reader $32_1$.

The memory 52 stores a program that executes in accordance with the Appendix and FIG. 2 and/or FIG. 3. In addition, the memory 52 stores the initial seed $IV_j$ applicable to the resource or resource class j protected by the reader $32_1$, the secret key $K_j$ applicable to the resource or resource class j protected by the reader $32_1$, the Y/N bits, (the common key $K_c$ if the FIG. 3 embodiment is implemented,) and such other information as is pertinent to the operation of the resource access control system 30.

The processor 50 reads the pertinent data from its memory 52 and from the intelligent card 38, executes the program represented by the Appendix and FIG. 2 and/or FIG. 3 when the intelligent card 38 is presented to the reader $32_1$, and appropriately grants or denies access to the corresponding resource. In accordance with that decision, the processor 50 appropriately controls a lock 56 or other mechanism pertinent to the resource so as to allow or deny access to that resource.

Figure 6:
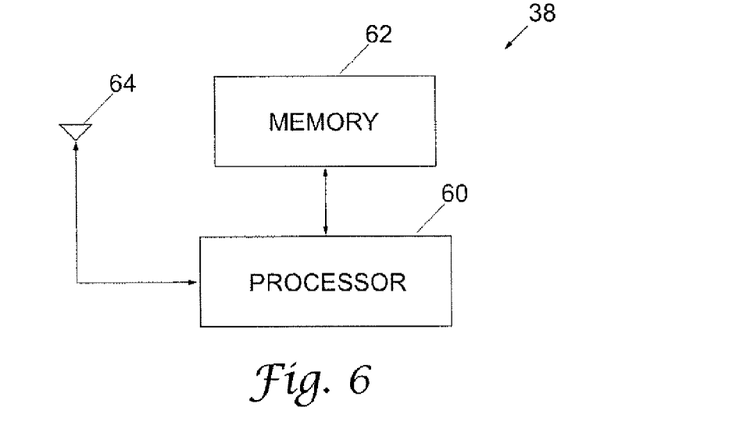
FIG. 6 illustrates an intelligent card of the physical resource access control system shown in FIG. 1; and, FIG. 7 illustrates a program that may be executed in connection with the physical resource access control system shown in FIG. 1.

FIG. 6 illustrates the intelligent card 38. As shown, the intelligent card 38 includes a processor 60, a memory 62, and an interface 64.

The interface 64 is a complement of the interface 54.

The memory 62 stores the user certificate $U_i$, the privileges $P(r_k)$, the hash value $S(r_k)$, and such other information as is pertinent to operation of the resource access control system 30. The user certificate $U_i$ identifies the user i who carries the intelligent card 38. The privileges $P(r_k)$ are issued to the user i with respect to one or more of the resources or resource classes $34_1, \ldots, 34_m$. The hash value $S(r_k)$ for a user is computed by the central authority in accordance with the Appendix and FIG. 2 and/or FIG. 3 and is communicated to the intelligent card 38 either directly by the central authority 36, or through one of the readers $32_1, \ldots, 32_n$, or through some other device.

The processor 60 controls communication between the intelligent card 38 and the readers $31_1, \ldots, 31_n$. The processor 60 also performs other calculations and processing as may be required of the intelligent card 38.

Figure 7:
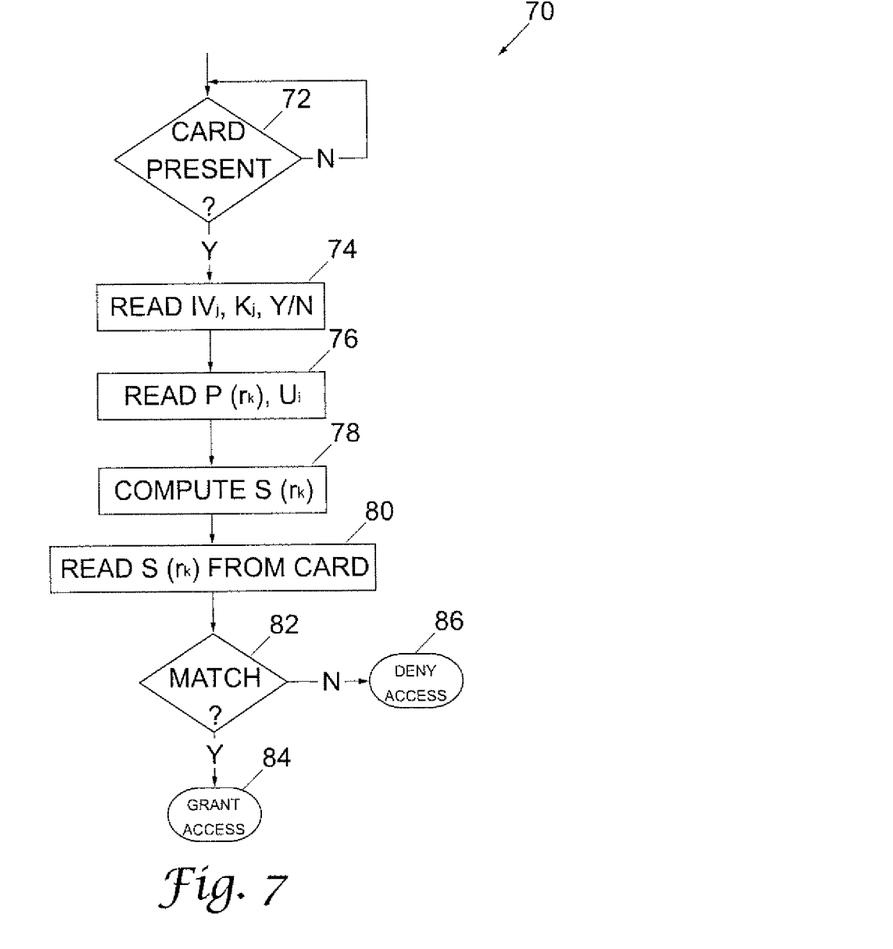

FIG. 7 illustrates a program 70 that may be executed in connection with the resource access control system 30 shown in FIG. 4. For example, the program 70 may be executed by the processors of the readers $32_1, \ldots, 32_n$. Accordingly, when the intelligent card 38 is presented to a reader as determined at 72, the program 70 at 74 reads the initial value $IV_j$, the secret key $K_j$, and the Y/N bits from the memory 52 of the reader corresponding to resource or resource class j to which the user desires access. Also, the program 70 at 76 causes the privileges $P(r_k)$ and the user certificate $U_i$ to be read from the memory 52 of the intelligent card 38.

The program 70 at 78 then computes the hash value $S(r_k)$ as described above based on the initial value $IV_j$, the secret key $K_j$, and the Y/N bits read at 74 and the privileges $P(r_k)$ and the user certificate $U_i$ read at 76. (The program 70 at 78 may also use the common key $K_c$ to compute the hash value when the embodiment of FIG. 3 is implemented.) Moreover, the program 70 at 80 causes the stored hash value $S(r_k)$ to be read from the memory 52 of the intelligent card 38. The program 70 at 82 then compares the hash value $S(r_k)$ that is read from the intelligent card 38 to the hash value $S(r_k)$ that it computes. If the two hash values match, the program 70 at 84 grants access to the resource. On the other hand, if the two hash values do not match, the program 70 at 86 denies access to the resource.

Certain modifications of the present invention have been discussed above. Other modifications of the present invention will occur to those practicing in the art of the present invention. For example, as described above, the privileges granted to a user are stored on the intelligent card carried by the user. Alternatively, the privileges granted to each user could be stored on the readers.

Also, as described above, the program 70 is executed by the readers $32_1, \ldots, 32_n$. However, at least portions of the program 70 may be executed by the processor of the intelligent card 38. For example, the hash value $S(r_k)$ may be computed by the processors of the readers $32_1, \ldots, 32_n$ based on the secret key $K_j$ stored in the memories of the readers $32_1, \ldots, 32_n$. However, this computed hash value $S(r_k)$ may then be transmitted by the particular one of the readers $32_1, \ldots, 32_n$ to the intelligent card 38. The intelligent card 38 could then compare the received hash value $S(r_k)$ to the hash value $S(r_k)$ that is stored in the memory 62 in order to determine whether a grant or deny decision should be made.

Moreover, as described above, certain information is written on the intelligent cards by the central authority. Instead, the information may be written on the intelligent cards by other devices such as one or more designated resources.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

APPENDIX

Procedure SignCertificates[i,j] (for resource j and user i)
Produce Encrypted Output
Input:
k bit secret key $K_j$
n bit $IV_j$
r-bit user ID $U_i$
r-bit Y/N
Output:
r-bit $T_1, T_2, T_3$
where $1 \leq r \leq n$
if t=1 then
 $I_1 \leftarrow IV_j$ {if $t=t_0$}
else
 $I_t \leftarrow OB_{t-1}$ {otherwise, update from previous day's output block}
endif
$OB_{t,1} \leftarrow E_{K_j}(I_t)$
$OB_{t,2} \leftarrow E_{K_j}(OB_{t,1})$
$OB_{t,3} \leftarrow E_{K_j}(OB_{t,2})$
$OB_t \leftarrow OB_{t,1}$
$T_1 \leftarrow OB_{t,1}$
$T_2 \leftarrow OB_{t,2} \oplus U_i$
$T_3 \leftarrow OB_{t,3} \oplus Y/N$
Produce Hash Output
Input:
r-bit $T_1, T_2, T_3$
n bit User access privileges $P(r_j)$ for this resource j
Output:
h bit hash value $S(r_j)$
H: $[1,0]^{3r+n} \rightarrow [1,0]^h$
$S(r_j) \leftarrow H(T_1|T_2|T_3|P(r_j))$

What is claimed is:

1. A method of controlling access to a resource comprising:
   reading a first code from a user carried device, wherein the first code comprises an encoded form of at least an ID of a user and at least one privilege, and wherein the privilege embodies a policy defining the user's access to the resource;
   comparing the first code to a second code; and
   permitting access only if the first code substantially matches the second code;
   wherein the comparing of the first code to a second code comprises:
      computing the second code based on the user ID, the privilege, and a secret key; and
      comparing the first code to the computed second code;
   wherein the computing of the second code comprises:
      generating an intermediate code based at least on the user ID and the secret key;
      concatenating the intermediate code and the privilege; and
      applying an encoding function to the concatenation of the intermediate code and the privilege so as to produce the second code.

2. The method of claim 1, wherein the first code is also based on the secret key.

3. The method of claim 1, further comprising: periodically changing the first code and the secret key synchronously.

4. The method of claim 1 wherein the encoding function comprises a hash function.

5. The method of claim 1 wherein the generating of an intermediate code comprises:
   generating a first intermediate code by applying the secret key to an initial value;
   generating a second intermediate code by applying the secret key to the first intermediate code to produce a first result and by adding the user ID to the result; and,
   generating a third intermediate code by applying the secret key to the second intermediate code to produce a second result and by adding a final value to the second result;
   and wherein the concatenating of the intermediate code and the privilege comprises concatenating the first, second, and third intermediate codes and the privilege.

6. The method of claim 1, further comprising: periodically changing the first and second codes synchronously.

7. The method of claim 1, wherein the first code is self-expiring.

8. The method claim 1, further comprising: revoking the privilege upon expiration of a limited time interval.

9. The method claim 1, wherein the resource comprises a first resource, wherein the privilege comprises a first privilege, and wherein the method further comprises reading a third code from the user carried device, wherein the third code comprises an encoded form of at least the ID of a user and at least a second privilege, and wherein the second privilege embodies a policy defining the user's access to a second resource.

10. A method of controlling access to a resource comprising:
    reading a first code from a user carried device, wherein the first code comprises an encoded form of at least an ID of a user and at least one privilege, and wherein the privilege embodies a policy defining the user's access to the resource;
    comparing the first code to a second code; and
    permitting access only if the first code substantially matches the second code;
    wherein the comparing of the first code to a second code comprises:
       computing the second code based on the user ID, the privilege, a secret key, and a common key, wherein the secret key applies only to the user, and wherein the common key applies to a plurality of users; and
       comparing the first code to the computed second code.

11. The method of claim 10 wherein the first code is also based on the secret key.

12. The method of claim 10 further comprising periodically changing the first code and the secret key synchronously.

13. The method of claim 10 wherein the computing of the second code comprises:
    generating an intermediate code based at least on the user ID and the secret key;
    concatenating the intermediate code, the privilege, and the common key; and,
    applying an encoding function to the concatenation of the intermediate code, the privilege, and the common key so as to produce the second code.

14. The method of claim 13 wherein the encoding function comprises a hash function.

15. The method of claim 13 wherein the generating of an intermediate code comprises:
    generating a first intermediate code by applying the secret key to an initial value;
    generating a second intermediate code by applying the secret key to the first intermediate code to produce a result and by adding the user ID to the result; and,
    generating a third intermediate code by applying the secret key to the second intermediate code to produce a second result and by adding a final value to the second result;
    and wherein the concatenating of the intermediate code, the privilege, and the common key comprises concatenating the first, second, and third intermediate codes, the privilege, and the common key.

16. A method of controlling access to a resource comprising:
    storing a first code on a user carried device, wherein the first code is based on at least an ID of a user, at least one privilege, a first secret key, and an encoding function, and wherein the privilege defines the user's access to the resource;
    computing a second code from the user ID, the privilege, a second secret key, and the encoding function, wherein the first and second secret keys are symmetrical, and wherein the second secret key is stored in a user carried device reader;
    comparing the first code to a second code; and
    permitting access only if the first code substantially matches the second code;
    wherein the computing of the second code comprises:
       generating an intermediate code based at least on the user ID and the second secret key;
       concatenating the intermediate code and the privilege; and
       applying the encoding function to the concatenation of the intermediate code and the privilege so as to produce the second code.

17. The method of claim 16, wherein the encoding function comprises a hash function.

18. The method of claim 16, further comprising:
    periodically and synchronously changing the first code and the second secret key.

19. The method of claim 16 wherein the generating of an intermediate code comprises:

generating a first intermediate code by applying the second secret key to an initial value;

generating a second intermediate code by applying the second secret key to the first intermediate code to produce a result and by adding the user ID to the result; and, generating a third intermediate code by applying the second secret key to the second intermediate code to produce a second result and by adding a final value to the second result;

and wherein the concatenating of the intermediate code and the privilege comprises concatenating the first, second, and third intermediate codes and the privilege.

20. A method of controlling access to a resource comprising:

storing a first code on a user carried device, wherein the first code is based on at least an ID of a user, at least one privilege, a first secret key, and an encoding function, and wherein the privilege defines the user's access to the resource;

computing a second code from the user ID, the privilege, a second secret key, and the encoding function, wherein the first and second secret keys are symmetrical, and wherein the second secret key is stored in a user carried device reader;

comparing the first code to a second code; and permitting access only if the first code substantially matches the second code;

wherein the computing of the second code comprises:

generating an intermediate code based at least on the user ID and the second secret key;

concatenating the intermediate code, the privilege, and a common key; and, applying an encoding function to the concatenation of the intermediate code, the privilege, and the common key so as to produce the second code.

21. The method of claim 20 wherein the generating of an intermediate code comprises:

generating a first intermediate code by applying the second secret key to an initial value;

generating a second intermediate code by applying the second secret key to the first intermediate code to produce a result and by adding the user ID to the result; and, generating a third intermediate code by applying the second secret key to the second intermediate code to produce a second result and adding a final value to the second result;

and wherein the concatenating of the intermediate code and the privilege comprises concatenating the first, second, and third intermediate codes, the privilege, and the common key.

22. A reader of an access control system that controls access to a resource comprising:

a memory that stores a secret key; and, a processor that reads the secret key from the memory, that reads an ID of a user, at least one privilege, and a first code from an user carried device carried by the user, that computes a second code based on the secret key read from the memory and the user ID and privilege read from the user carried device, that compares the first code to the second code, and that permits access to the resource based on the comparison, wherein the privilege defines the user's access to the resource, and wherein the first code comprises an encoded form of at least the user ID and the privilege;

wherein the reader computes the second code by:

generating an intermediate code based at least on the user ID and the secret key;

concatenating the intermediate code and the privilege; and, applying an encoding function to the concatenation of the intermediate code and the privilege so as to produce the second code.

23. The reader of claim 22 wherein the encoding function comprises a hash function.

24. The reader of claim 22 wherein the reader generates the intermediate code by:

generating a first intermediate code by applying the secret key to an initial value;

generating a second intermediate code by applying the secret key to the first intermediate code to produce a result and by adding the user ID to the result; and, generating a third intermediate code by applying the secret key to the second intermediate code to produce a second result and by adding a final value to the second result;

and wherein the concatenating of the intermediate code and the privilege comprises concatenating the first, second, and third intermediate codes and the privilege.

25. The reader of claim 22, wherein the secret key comprises a first secret key, wherein the first code is based on a second secret key, and wherein the first and second secret keys are symmetrical.

26. A reader of an access control system that controls access to a resource comprising:

a memory that stores a secret key; and a processor that reads the secret key from the memory, that reads an ID of a user, at least one privilege, and a first code from an user carried device carried by the user, that computes a second code based on the secret key read from the memory and the user ID and privilege read from the user carried device, that compares the first code to the second code, and that permits access to the resource based on the comparison, wherein the privilege defines the user's access to the resource, and wherein the first code comprises an encoded form of at least the user ID and the privilege;

wherein the reader computes the second code based on the secret key read from the memory, the user ID and privilege read from the user carried device, and a common key.

27. The reader of claim 26 wherein the reader computes the second code by:

generating an intermediate code based at least on the user ID and the secret key;

concatenating the intermediate code, the privilege, and the common key; and, applying an encoding function to the concatenation of the intermediate code, the privilege, and the common key so as to produce the second code.

28. The reader of claim 27 wherein the encoding function comprises a hash function.

29. The reader of claim 27 wherein the reader generates the intermediate code by:

generating a first intermediate code by applying the secret key to an initial value;

generating a second intermediate code by applying the secret key to the first intermediate code to produce a result and by adding the user ID to the result; and, generating a third intermediate code by applying the secret key to the second intermediate code to produce a second result and by adding a final value to the second result; and, and wherein the concatenating of the intermediate code, the privilege, and the common key comprises concatenating the first, second, and third intermediate codes, the privilege, and the common key.

30. A user carried device for use by an access control system that controls access to a resource comprising:
   a memory that stores an ID of a user, at least one privilege, and a hash value, wherein the hash value is based on an application of a hash function to encrypted data, wherein the encrypted data is based on the user ID, the privilege, and a key, and wherein the privilege embodies a policy governing the user's access to the resource; and,
   an interface that communicates the user ID, the privilege, and the hash value to a reader of the access control system.

31. The user carried device of claim 30 wherein the key comprises a secret key applicable to only one user, wherein the hash value is further based on a common key, and wherein the common key is applicable to a plurality of users.

32. The user carried device of claim 30 wherein the hash value comprises a self-expiring hash value.

* * * * *